United States Patent
Umeda

Patent Number: 5,864,380
Date of Patent: Jan. 26, 1999

[54] PROGRESSIVE POWER LENS

[75] Inventor: Toshiaki Umeda, Tokyo, Japan

[73] Assignee: Nikon Corporation, Tokyo, Japan

[21] Appl. No.: 815,801

[22] Filed: Mar. 12, 1997

[30] Foreign Application Priority Data

Mar. 14, 1996 [JP] Japan ................................. 8-085698

[51] Int. Cl.$^6$ .................................................. G02C 7/06
[52] U.S. Cl. ............................................................ 351/169
[58] Field of Search ..................................... 351/168, 169, 351/170, 171, 172

[56] References Cited

U.S. PATENT DOCUMENTS

| | | | |
|---|---|---|---|
| 4,762,408 | 8/1988 | Shinohara | 351/169 |
| 4,955,712 | 9/1990 | Barth et al. | 351/169 |
| 5,123,725 | 6/1992 | Winthrop | 351/169 |
| 5,708,493 | 1/1998 | Ahsbahs et al. | 351/169 |

FOREIGN PATENT DOCUMENTS 2-248920 10/1990 Japan .
6-90368 11/1994 Japan .

*Primary Examiner*—Georgia Epps
*Assistant Examiner*—Jordan M. Schwartz
*Attorney, Agent, or Firm*—Klarquist Sparkman Campbell Leigh & Whinston, LLP

[57] ABSTRACT

A progressive power eyeglass lens is disclosed. The lens is particularly suitable for close-range work while facilitating distinct vision up to a specific distance that is substantially separated from the close-view distance. The lens also provides a wide distinct-vision area in the near-vision region. The lens comprises a near-vision correction region with a surface refractive power suitable for near vision, a specific-distance-vision correction region with a surface refractive power suitable for a specific distance that is substantially separated from the close-view distance, and a progressive zone between the near-vision correction region and the specific-distance-vision correction region that provides a gradual change in refractive index from the near-vision correction region to the specific-distance-vision correction region. The length of the progressive zone from the center of the specific-distance-vision correction region to the center of the near-vision correction region is at least 15 mm, and the minimum width of the distinct-vision area in the near-vision correction region is at least 5 times the minimum width of the distinct-vision area in the progressive zone.

7 Claims, 4 Drawing Sheets

PROGRESSIVE POWER LENS

FIELD OF THE INVENTION

This invention pertains to eyeglass lenses. More specifically, the invention pertains to an eyeglass lens having plural portions (regions) each having a different focal length, and including a progressive-power zone between the portions.

BACKGROUND OF THE INVENTION

In the past, bifocal and trifocal lenses have been popular as eyeglass lenses for aiding the eyes' accommodation when the eye's accommodation ability has weakened. In addition, monofocal lenses for specific near-distances are also well known. In recent years, "progressive power" lenses have started to become common for use as eyeglass lenses.

A progressive power lens typically includes a far-vision corrective portion (also termed herein a "far-vision portion") usually located at the upper portion of the lens when the lens is being worn, a near-vision correction portion (termed herein a "near-vision portion") usually located at the lower portion of the lens when the lens is worn, and an "intermediate-vision portion" between the near-vision portion and the far-vision portion. The intermediate-vision portion comprises a "progressive zone" that defines a gradual transition in refractive power between the far-vision portion and the near-vision portion. I.e., in the progressive zone, the refractive power exhibits a relatively gradual change from the far-vision portion to the near-vision portion.

Progressive power lenses can advantageously at least partially compensate for decreased accommodation ability of a wearer's eyes by lowering the wearer's visual axis when the lenses are worn. Also, unlike conventional bifocal and trifocal lenses, progressive power lenses do not present any discernible dividing lines separating one portion from another on the surface of the lens.

The distance between the center of the far-vision portion and the center of the near-vision portion is referred to herein as the "length of the progressive-zone." The amount of change (usually an increase in refractive power impressed between the far-vision center and the near-vision center) is called the "additional power." In addition, as used herein, terms including "up" or "upper", "down" or "lower", "horizontal," and "vertical" indicate positional relationships in the lens when being worn.

Thus, conventional progressive power lenses comprise three portions: a far-vision portion, a near-vision portion, and an intermediate-vision portion, all formed on a single refractive surface having limited area. If a wide "distinct-vision area" (an area through which the wearer can see without experiencing blurred vision) is to be maintained in the far-vision portion and in the near-vision portion, and when the space between the two portions is defined by an intermediate-vision portion comprising a progressive zone, lens aberrations tend to be concentrated in areas flanking the progressive zone. As a result, focal defects (image blurring) and image distortions occur particularly in the flanking areas of the progressive zone. Unfortunately, the image distortions are manifest as image waviness and other annoying phenomena to a wearer of such lenses when the wearer's visual axis is moved near or within such flanking areas.

Various schemes are manifest in the known progressive power lenses based on differing perspectives on how to solve the problems summarized above.

FIG. 3 schematically illustrates the positional relationships of various portions of a conventional progressive power lens designed symmetrically around a principal meridional curve (such a lens is termed a "symmetrical progressive power lens"). The depicted progressive power lens includes a far-vision portion F located at the upper portion of the lens when the lens is worn, a near-vision portion N located at the lower portion of the lens, and an intermediate-vision portion P located between the far-and near-vision portions. Proceeding downward across the intermediate-vision portion P, the refractive power of the lens progressively changes from the refractive power of the far-vision portion to that of the near-vision portion.

The surface profile of the FIG. 3 lens is defined along a reference line M-M' (termed a "principal meridional curve"). The principal meridional curve M-M' extends on the object-side lens surface and represents a line along which a plane perpendicular to the page intersects the lens. The principal meridional curve M-M' extends (at an angle relative to vertical) from top to bottom at nearly the center of the surface of the lens as worn by the wearer. The principal meridional curve M-M' can be used for expressing the specifications of the lens, such as additional power. In a progressive power lens that has been thus symmetrically configured, the far-vision center OF of the far-vision portion F, the far-vision eye point E, the geometric center OG of the lens surface, and the near-vision center (i.e., the near-vision eye point) ON are all located on the principal meridional curve M-M'.

An "asymmetrical progressive power lens" according to the prior art is shown in FIG. 4. In the FIG. 4 lens, the near-vision portion N is shifted toward the nose side relative to the far-vision portion F and the intermediate-vision portion P. I.e., the near-vision portion N, the intermediate-vision portion P, and the far-vision portion are arranged asymmetrically with respect to each other.

The asymmetrical progressive power lens as shown in FIG. 4 also has a principal meridional curve M-M'. But, rather than being linear as in FIG. 3, the principal meridional curve M-M' in FIG. 4 comprises two lines intersecting at the geometric center OG. The first line represents a first plane (perpendicular to the page) extending through the far-vision center OF of the far-vision portion F, the far-vision eye point E, and the geometric center OG of the lens surface; the second line represents a second plane (perpendicular to the page) extending through the near-vision center ON and the geometric center OG of the lens surface.

In a symmetrical progressive power lens (FIG. 3), the principal meridional curve M-M' symmetrically divides the lens refractive surface into a noseward portion and an earward portion. In an asymmetrical progressive power lens (FIG. 4), in contrast, the principal meridional curve M-M' extending across the intermediate-vision portion P and the near-vision portion N is shifted toward the nose side.

FIG. 5 shows an astigmatic-difference distribution in a conventional symmetrical progressive power lens. In FIG. 5, curves that connect points of equal astigmatic difference, i.e., isoastigmatic-difference curves, are shown.

Generally, the astigmatic-difference value at which a wearer can view an object without experiencing blurred vision is said to be 0.5 diopter (0.5 D) or less. Thus, in FIG. 5, the minimum isoastigmatic-difference curve is a 0.5-D curve. Consequently, objects generally can be viewed without blurred vision within an area including the principal meridional curve and bounded by this 0.5-D isoastigmatic-difference curve. The area in which a wearer can view an object without experiencing blurred vision is termed the "distinct-vision area." The width, in the horizontal direction, of the distinct-vision area is a critical factor in evaluating the performance of a progressive power lens.

The performance of a progressive power lens is evaluated by the maximum width of the distinct-vision area in the far-vision portion F above the far-vision center OF, by the maximum width of the distinct-vision area in the near-vision portion N below the near-vision center ON, and by the minimum width of the distinct-vision area in the intermediate-vision portion P between the far-vision center OF and the near-vision center ON.

A progressive power lens desirably has the following characteristics:

(a) The width of the distinct-vision area is as wide as practicably possible in the far-vision portion F and in the near-vision portion N.

(b) The width of the distinct-vision area is as wide as practicably possible in the intermediate-vision portion P, and the length of the progressive zone along the principal meridional curve is appropriate for the intended use of the lens. (E.g., if the progressive zone is long, eye movement can be undesirably increased when using the lens for close vision, which can cause rotation fatigue. If the progressive zone is short, the distinct-vision area could be too narrow in the intermediate-vision portion P.)

(c) Aberrations are minimized on the refractive surface.

Progressive power lenses typically have a single refractive surface. Because of this, in conventional progressive power lenses, relatively large lens aberrations exist in regions flanking the progressive zone. Such aberrations are generally regarded as theoretically unavoidable in progressive power lenses.

In order for a progressive power lens to be most comfortable for the wearer, the lens should be configured to match the usage requirements of the wearer. Various progressive power lenses are known that match a wearer's specific usage requirements.

For example, FIG. 6 shows typical isoastigmatic-difference curves for a conventional progressive power lens for "everyday use" that emphasizes both far and near vision. (An "everyday-use" lens can be used in many different ways under different conditions by the wearer.) In a lens such as that of FIG. 6, the length of the progressive zone along the principal meridional curve is normally 12 to 15 mm. The angle of ocular rotation is made small (short progressive-zone length), minimizing the amount of movement of the visual axis for close-range vision, while a wide distinct-vision area is maintained in the far-vision portion. Furthermore, a significant distinct-vision area is provided in the near-vision portion and far-vision portion for maximal comfort during use for near vision and far vision.

One of the flaws in conventional progressive power lenses emphasizing both far and near vision is that the width of the distinct-vision area in the intermediate-vision portion is relatively narrow. This results in large lens aberrations in the areas flanking the distinct-vision area. This, in turn, causes substantial image "swim" whenever the wearer's visual axis swings to the flanking areas. Consequently, conventional progressive power lenses emphasizing both far and near vision are suited to usage conditions in which the visual axis does not swing greatly to the flanking areas, e.g., for reading and writing, etc.

FIG. 7 depicts typical isoastigmatic-difference curves for a progressive power lens for everyday use emphasizing far and intermediate vision. In such a lens, the length of the progressive zone along the principal meridional curve is normally 18 mm or more. Also, the width of the distinct-vision area is widest in the far-vision portion. Because the length of the progressive zone along the principal meridional curve is long, the width of the distinct-vision area is also relatively wide in the intermediate-vision portion.

One of the flaws in conventional progressive power lenses emphasizing far and intermediate vision is that they are not suited for close-range work due to the long progressive zone and the narrow distinct-vision area in the near-vision portion. Consequently, conventional progressive power lenses emphasizing far and intermediate vision are suited for usage conditions in which the far-vision portion and the intermediate-vision portion are of primary importance, e.g., participating in sports, etc.

FIG. 8 depicts typical isoastigmatic-difference curves for a conventional "balanced" progressive-power lens for everyday use. In such a lens, the length of the progressive zone is normally 15 to 18 mm. Such a lens exhibits a performance that is between that of a conventional lens emphasizing far and near vision and a conventional lens emphasizing far and intermediate vision. The balanced progressive power lens is the typical type of progressive power lens now being sold. Balanced progressive power lenses are suitable for use in eyeglasses that can be continuously worn for long periods of time, i.e., "extended-wear" glasses.

In any event, with conventional progressive power lenses, a wearer can select from lenses that emphasize far and near vision, far and intermediate vision, or offer a balanced performance. The type usually selected by a particular user is regarded as the most appropriate to his/her usage conditions.

The three types of progressive power lenses discussed above are similar in that they all provide comfortable far vision (e.g., when looking straight ahead at a distant object). This is because far vision is necessary and indispensable in everyday life.

As discussed above, progressive power lenses are equipped with a far-vision portion and a near-vision portion and an intermediate-vision portion comprising a progressive zone in which the refractive power gradually changes, all defined by a single refractive surface. Consequently, when comfort principally for far vision is emphasized by situating a wide distinct-vision area in the far-vision portion, the width of the distinct-vision area of one or both of the intermediate-vision portion and the near-vision portion is conventionally sacrificed to reduce aberrations on the refractive surface as much as possible. This is also true for balanced progressive power lenses.

The three types of progressive power lenses discussed above are generally referred to as "everyday-use progressive power lenses."

As discussed above, progressive power lenses should be designed to meet the specific use requirements of the wearer. Whenever the wearer's use requirement is primarily targeted to close-range work, the progressive power lens worn by the user must be of a type in which the width of the distinct-vision area in the near-vision portion is wider or at least equal to the width of the distinct-vision area of the far-vision portion; i.e., a progressive power lens emphasizing intermediate and near vision. The progressive power lenses disclosed in, e.g., Japan Laid-open Patent Document No. HEI 2-248920 and Japan Patent Publication No. HEI 6-90368 are examples of this type of lens emphasizing intermediate and near vision.

However, whereas prior-art progressive power lenses emphasizing intermediate and near vision provide a somewhat improved vision performance, further improvement is desired. In other words, with the progressive power lens disclosed in Japan Laid-open Patent Document No. HEI 2-248920 emphasizing intermediate and near vision, each of the far-vision portion and the near-vision portion is a separate mathematical point. In addition, the astigmatic difference is distributed over the entire surface area of the lens. As a result, with such a lens, the astigmatic difference of the entire lens may be minimized, but the total astigmatic difference remains, so the distinct-vision areas are small. Widening the distinct-vision areas in the far-vision portion and the near-vision portion using a standard progressive power lens leaves a large part of the astigmatic difference on the lens.

In addition, with the progressive power lens disclosed in Japan Patent Publication No. HEI 6-90368 emphasizing intermediate-near vision, the gradient of refractive power on the principal meridional curve is decreased. Because of this, the position of the far-vision eye point is moved a substantial distance upward, and the position of the near-vision eye point is nearly the same as the corresponding position in a conventional progressive power lens for everyday use. As a result, using such a lens for predominantly close-up work disadvantageously can cause wearer "rotation fatigue" (fatigue from eyeball movement).

In conventional progressive power lenses, it has been impossible in a single lens surface to provide a far-vision portion, a near-vision portion, and the intermediate-vision portion with wide respective distinct-vision areas and with low rotation fatigue, while adequately controlling astigmatic differences.

SUMMARY OF THE INVENTION

The present invention rectifies many of the problems described above with the prior art. Thus, an object of the invention is to provide a progressive power eyeglass lens suitable for close-range work and that provides a wearer with distinct vision up to a specific-distance-vision distance substantially outside the near-vision range, while also providing a wide distinct-vision area in the near-vision portion.

According to a preferred embodiment of the invention, a progressive power lens is provided that comprises, with respect to a principal meridional curve dividing the refractive surface of the lens into a noseward portion and an earward portion, a near-vision correction portion, a specific-distance-vision correction portion, and a progressive zone between the near-vision correction portion and the specific-distance-vision correction portion. The near-vision correction portion has a surface refractive power suitable for providing a wearer of the lens with corrected near vision. The specific-distance-vision correction portion has a surface refractive power suitable for providing a wearer with corrected vision for the specific distance, wherein the "specific distance" is substantially separated from the "near-vision distance". The progressive zone is situated between the near-vision correction portion and the specific-distance-vision correction portion. The progressive zone exhibits a gradual change in refractive power from the near-vision correction portion to the specific-distance-vision correction portion, and provides a desired additional power between the center of the near-vision correction portion and the center of the specific-distance-vision correction portion. The length of the progressive zone along the principal meridional curve is 15 mm or more. Each of the near-vision correction portion, the progressive zone, and the specific-distance-vision correction portion has a respective distinct-vision area. The distinct-vision area of the near-vision correction portion has a maximal width that is at least five times the minimum width of the distinct-vision area of the progressive zone.

Also with respect to a preferred embodiment, the maximal width of the distinct-vision area of the specific-distance-vision correction portion is at least two times the minimum width of the distinct-vision area in the progressive zone.

The progressive zone has a length, extending along the principal meridional curve, of at least 15 mm and preferably no greater than 19 mm. The progressive zone provides a desired additional power between the center of the near-vision correction portion and the center of the specific-distance-vision correction portion. Also, the value of the maximum astigmatic difference in the refractive surface of the lens is preferably less than the value of the additional power.

The foregoing and additional features and advantages of the present invention will be more readily apparent from the following detailed description, which proceeds with reference to the accompanying drawings.

DETAILED DESCRIPTION

Figure 1:
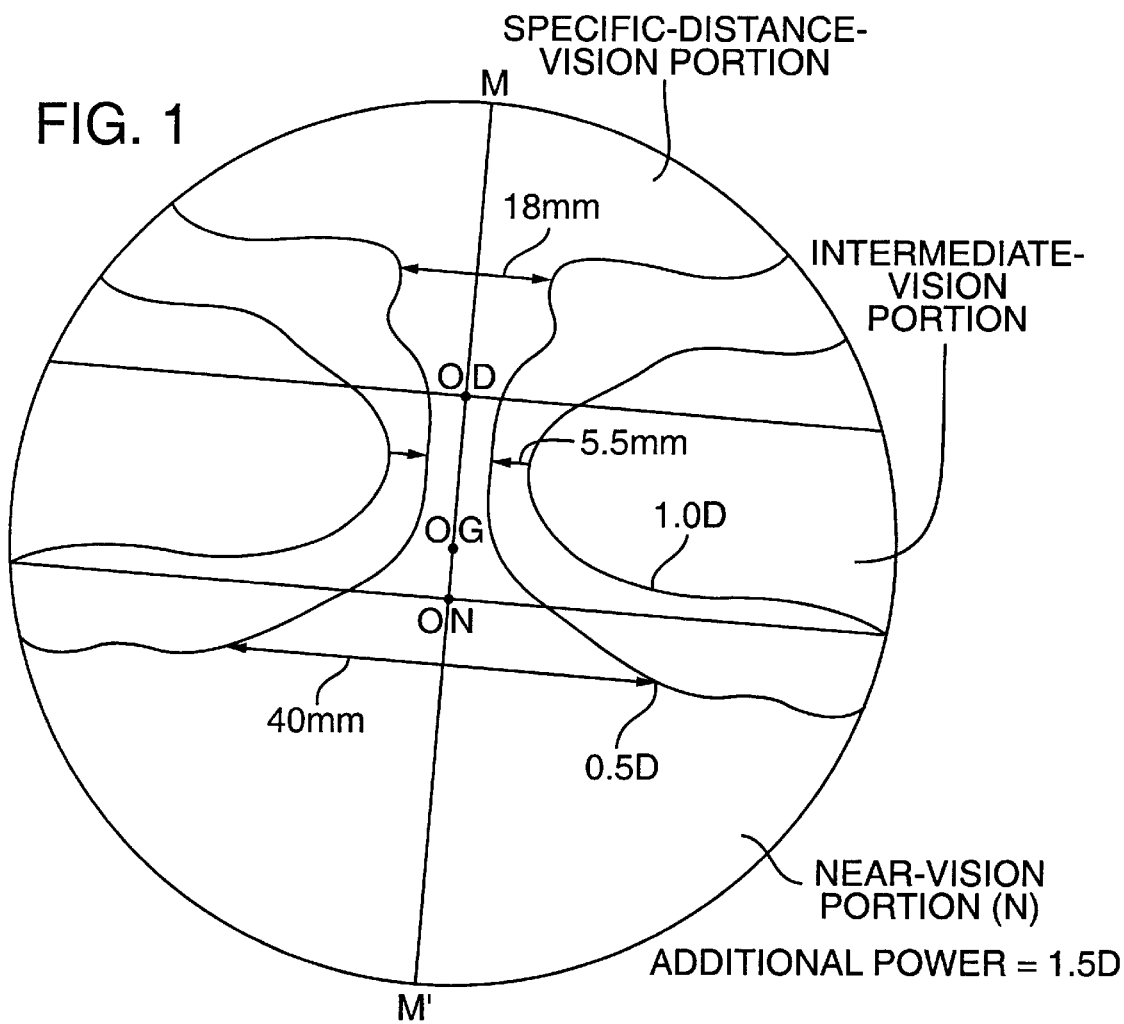
FIG. 1 depicts isoastigmatic-difference curves for a progressive power lens according to an example embodiment of the present invention.

A preferred embodiment of a progressive power lens according to the invention lacks a "far"-vision portion. Rather, the preferred embodiment provides correction up to a specific distance. "Specific distance" differs from "far" in that "far" encompasses distances greater than about 5 m from the viewer. "Near" encompasses distances no greater than about 40 cm. A "specific distance" thus lies between near and far and is thus neither near nor far. The preferred embodiment provides correction up to a specific distance according to the degree of presbyopia of the wearer (the distance can be up to the far-vision distance for wearers having light to moderate presbyopia wherein the wearer still has some remaining accommodation ability).

A lens according to the present invention also comprises an "intermediate-vision portion" situated between the near-vision portion and the specific-distance-vision portion. The intermediate-vision portion comprises a progressive zone in which there is a progressive change in refractive power of the lens from the near-vision portion and the specific-distance-vision portion. The progressive zone generally has sufficient length to minimize rotational fatigue while providing enhanced wearer comfort when the lens is worn for close-range work.

The near-vision portion is provided with a wide distinct-vision area and a reduced maximum astigmatic difference (i.e., the difference between the maximum value and the minimum value of the refractive power at a point on the lens surface). The intermediate-vision portion also has a significant distinct-vision area.

The specific-distance-vision correction portion, having a surface refractive power corresponding to a specific distance (between "near" and "far" as defined above), is also termed herein the "specific-distance-vision portion."

The distance from the center of the specific-distance-vision portion and the center of the near-vision portion is called the "progressive-zone length." The change in refractive power between the center of the specific-distance-vision portion and the center of the near-vision portion is termed the "additional power."

By way of example, a lens according to a preferred embodiment of the present invention has an additional power of 1.5 D, with the near-vision portion at 2.5 D at a distance of 40 cm, and a specific-distance-vision portion at 1.0 D at a specific distance of up to 1 m (for use by a person having no accommodation ability). The power of the specific-distance-vision portion differs according to the accommodation ability of the wearer (if the wearer has adjusting power, he or she will be able to see more than 5 m in the distance). If the value of the additional power is increased, the specific-distance vision distance can be increased; however, lens aberration (the astigmatic difference) will get worse, with the regions of the lens through which the wearer can see clearly becoming smaller.

To more concretely explain the above, in a progressive power lens according to the invention, each of the near-vision portion and the specific-distance-vision portion has a surface refractive power. The length of the progressive zone is at least 15 mm, and the maximum width of the distinct-vision area in the near-vision portion is at least five times the minimum width of the distinct-vision area in the progressive zone. Consequently, a lens according to the invention provides an extremely wide distinct-vision area in the near-vision portion. The lens also provides distinct vision up to the specific-distance-vision distance while maintaining a sufficiently wide distinct-vision area in the intermediate-vision portion by means of the 15-mm or longer progressive zone.

In addition, in a preferred embodiment of this invention, the maximum width of the distinct-vision area in the specific-distance-vision portion is at least two times the minimum width of the distinct-vision area in the progressive zone. Consequently, a sufficiently wide distinct-vision area can be maintained in the specific-distance-vision portion as well.

Furthermore, in a preferred embodiment of this invention, the length of the progressive zone is preferably 15 to 19 mm. Thus, the angle of eyeball rotation can be made smaller, and the feeling of fatigue resulting from eyeball rotation can be substantially reduced compared to a conventional intermediate-near type progressive power lens. (Incidentally, by way of comparison, the length of the progressive zone in conventional progressive power lenses for intermediate and near vision is normally around 23 mm to 25 mm.)

Additionally, in a preferred embodiment of this invention, the maximum astigmatic difference value (i.e., the value of the astigmatic difference at the location on the lens having the largest astigmatic difference of the entire lens) is preferably smaller than the value of the additional power. As a result, a wide and stable distinct-vision area can be maintained along the progressive zone. Even better results are obtained by making the value of the maximum astigmatic difference equal to or less than the additional power value minus 0.5 diopter.

Thus, the present invention provides a progressive power lens suitable for wearing when performing close-range work (i.e., while engaging in work requiring use of the near-vision portion and the intermediate-vision portion of the lens). This end is achieved while requiring a small ocular rotational angle while maintaining an extremely wide distinct-vision area in the near-vision portion.

Even greater wearing comfort can be obtained by combining properties of a progressive power lens of this invention with properties of a conventional progressive power lens for everyday use.

An example embodiment of this invention will be explained based on the attached figures.

Performance evaluations were conducted on progressive power lenses associated with this example embodiment which has a refractive-surface profile like that described above.

FIG. 1 shows isoastigmatic-difference curves for a progressive power lens associated with an example embodiment of this invention. In FIG. 1, isoastigmatic-difference curves are shown for each 0.5 diopter (0.5 D). The line M-M' is the principal meridional curve, OG is the geometric center of the lens, OD is the center of the specific-distance-vision portion, and ON is the center of the near-vision portion.

In a progressive power lens that emphasizes intermediate and near vision, the base curve (i.e., the standard spherical curvature) of the near-vision portion N is 5.00 diopter and the additional power is 1.50 diopter. For example, with a presbyopic wearer having an accommodation of 1.00 diopter with a close-range working distance (minimum distance that can be clearly seen through the near-vision portion of the lens) of 0.3 m, the diopter of the near-vision portion is (1 m)/(0.3 m)=3.33 D. The diopter of the specific-distance-vision portion is 1.5 diopters less than the diopter of the near-vision portion: (3.33 D−1.5 D)=1.833 D. The distance range that can be seen when not relying upon any accommodation ability of the eye is (1 m)/(1.833 D)=0.546 m; however, in this instance the eye has an accommodation ability of 1.0 D. Thus, the specific-distance-vision diopter is 1.833 D−1.0 D=0.833 D. Therefore, the distance range for distinct vision is 30 cm to [(1 m)/(0.833 D)=1.2 m].

As is clear from FIG. 1, it can be seen that the width of the distinct-vision area in the near-vision portion is wider than the width of the distinct-vision area in the specific-distance-vision portion. In addition, the value of the maximum astigmatic difference is 1.00 diopter, which is the value of the additional power 1.50 diopter minus 0.5 diopter. Thus, since the maximum astigmatic difference is small, a wider distance range will be seen clearly through the lens of FIG. 1. Furthermore, the width of the distinct-vision area in the specific-distance-vision portion is 13 mm or more, the width of the distinct-vision area in the near-vision portion is 40 mm or more, and the minimum width of the distinct-vision area in the progressive zone is approximately 5.5 mm. As a result, the maximum width of the distinct-vision area in the near-vision portion is over 7.2 times the minimum width of the distinct-vision area in the progressive zone, and the maximum width of the distinct-vision area in the specific-distance-vision portion is over 2.3 times the minimum width of the distinct-vision area in the progressive zone. (It is noted that the minimum width of the distinct-vision area in the progressive zone is greater than zero.)

Figure 2:
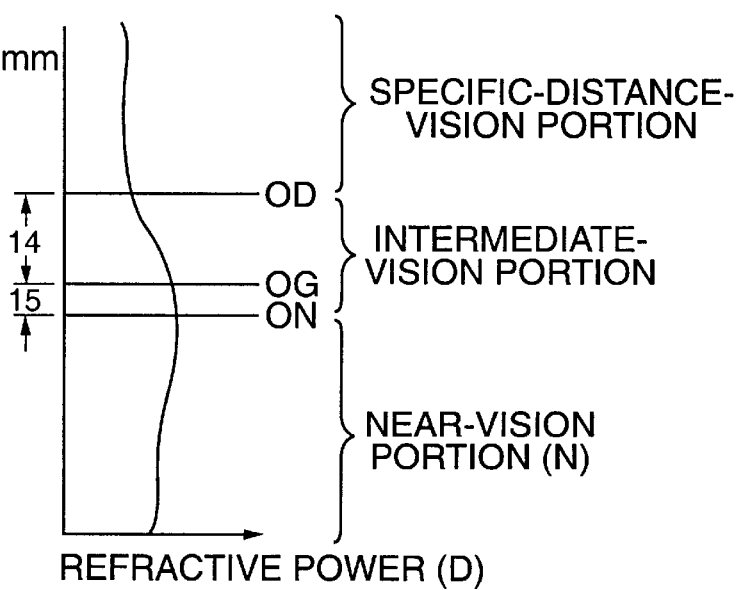
FIG. 2 is a profile of the refractive power along the principal meridional curve M-M' of the FIG. 1 lens.
Figure 3:
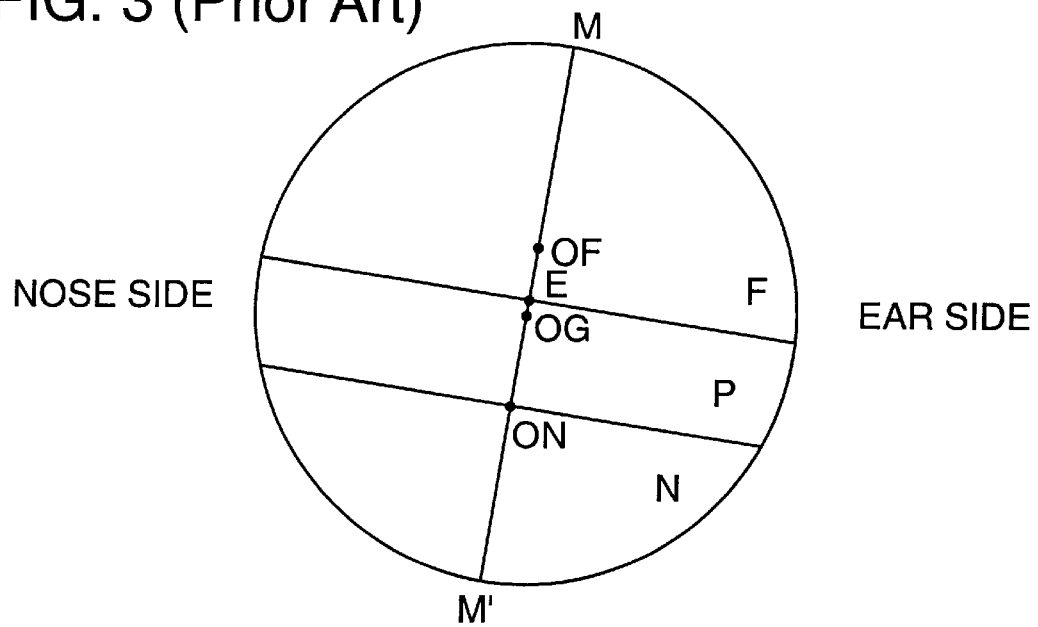
FIG. 3 shows portions in a prior-art symmetrical progressive power lens.
Figure 4:
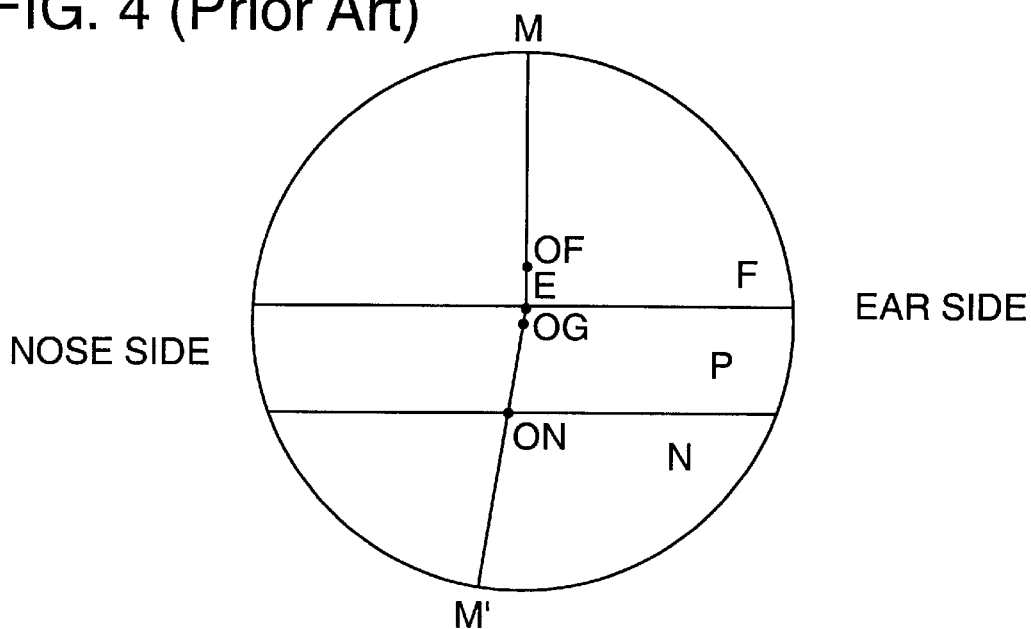
FIG. 4 shows portions in a prior-art asymmetrical progressive power lens.
Figure 5:
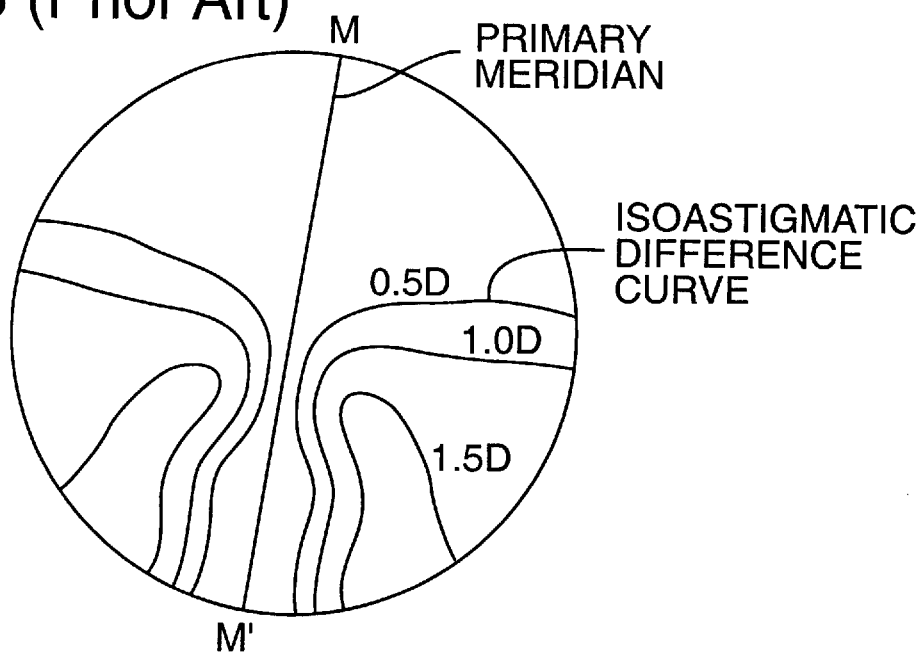
FIG. 5 depicts typical isoastigmatic-difference curves for a prior-art symmetrical progressive power lens.
Figure 6:
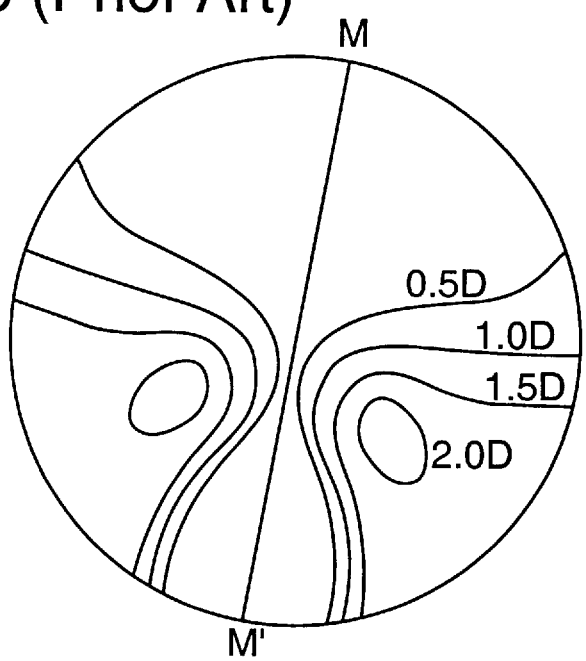
FIG. 6 depicts typical isoastigmatic-difference curves for a prior-art progressive power lens for everyday use, wherein far and near vision are emphasized.
Figure 7:
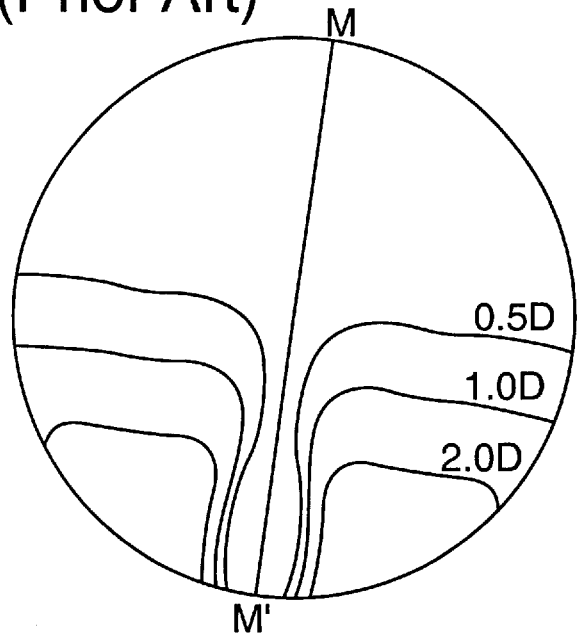
FIG. 7 depicts typical isoastigmatic-difference curves for a prior-art progressive power lens for everyday use, wherein far and intermediate vision are emphasized.
Figure 8:
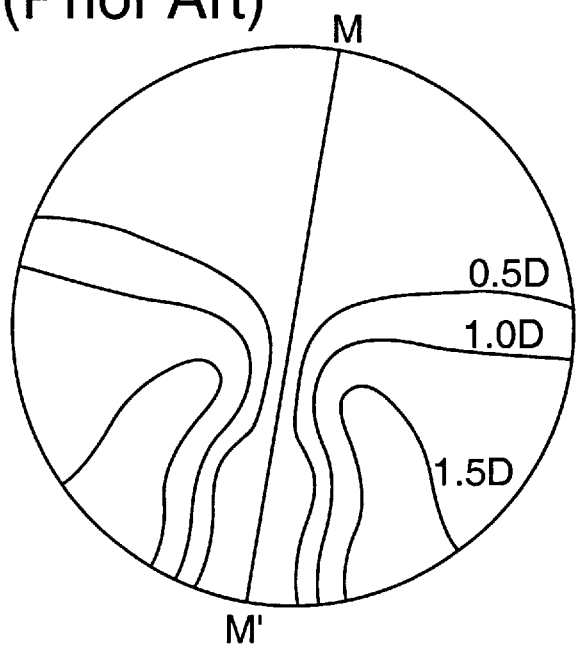
FIG. 8 depicts typical isoastigmatic-difference curves for a prior-art progressive power lens for everyday use, wherein a "balanced" vision is emphasized.

FIG. 2 shows the changes in refractive power along the principal meridional curve M-M' in FIG. 1.

The center OD of the specific-distance-vision portion is located 14 mm above the geometric center OG of the lens. The center ON of the near-vision portion is located 5 mm below the geometric center OG. In other words, the length of the progressive zone, which extends along the principal meridional curve M-M' between the center OD of the specific-distance-vision portion and the center ON of the near-vision portion is 19 mm.

A progressive power lens according to this example embodiment that emphasizes intermediate and near vision sacrifices the distinct-vision area in the specific-distance-vision portion somewhat in order to achieve wearing comfort up to a specific-distance-vision distance which is substantially separated from (i.e., outside the distance range of) the near-vision distance. In this example embodiment, since the center ON of the near-vision portion is slightly (5 mm) below the geometric center OG of the lens, an extremely small amount of eye movement in the visual axis occurs during close-range work. (In this instance, OG corresponds to the eye point, which is the standard position where the lens is set in an eyeglass frame.) By way of comparison, in a conventional progressive power lens for near- and intermediate-vision use, the center of the near-vision portion is in nearly the same position as in a conventional progressive power lens for everyday use, i.e., approximately 14 to 16 mm below the geometric center OG. In addition, an extremely wide distinct-vision area of over 40 mm was provided in this example embodiment for close-range work.

It is well known that the smaller the value of the maximum astigmatic difference in the intermediate-vision portion, the wider the distinct-vision area can be made in the progressive zone. In this example embodiment, the maximum astigmatic difference value is 1.00 diopter. If it is considered that the length of the progressive zone along the principal meridional curve is 19 mm, and that wide distinct-vision areas are being maintained in both the specific-distance-vision portion and the near-vision portion, then the maximum astigmatic difference value in this example embodiment is very small. As a result, a sufficiently wide distinct-vision area is provided as well in the intermediate-vision portion around the progressive zone.

Furthermore, the progressive power lens of this example embodiment for near and intermediate vision has a wide distinct-vision area in the specific-distance-vision portion and has a short progressive-zone length of preferably no greater than 19 mm. Consequently, the lens provides a comfortable range of vision without any peculiar feeling by the wearer engaged in close-range work but looking up at an object situated at a specific-distance-vision distance.

The foregoing description is made with respect to an example embodiment in which the width of the distinct-vision area in the near-vision portion is wider than the width of the distinct-vision area in the specific-distance-vision portion. However, the same principles can also be applied to a progressive power lens in which the width of the distinct-vision area in the near-vision portion is nearly equal to the width of the distinct-vision area in the specific-distance-vision portion.

Furthermore, this invention can also be applied to asymmetrical progressive power lenses.

Therefore, according to the present invention, a progressive power lens is provided that can be used comfortably for close-range work and for providing a wearer with distinct vision up to a specific-distance-vision distance that is substantially separated from the close-vision distance, while maintaining a wide distinct-vision area in the near-vision portion. The length of the progressive zone along the principal meridional curve is preferably 19 mm or less, thereby providing a comfortable progressive power lens for close-range work with minimal rotational fatigue being experienced by the wearer.

Whereas the invention has been described in connection with preferred embodiments, it will be understood that the invention is not limited to those embodiments. On the contrary, the invention is intended to encompass all modifications, alternatives, and equivalents as may be included within the spirit and scope of the invention as defined by the appended claims.

What is claimed is:

1. A progressive power lens, comprising, along a principal meridional curve extending across a refractive surface of the lens and dividing the lens into a noseward portion and an earward portion:

(a) a near-vision correction portion including a center and having a refractive power suitable for vision at a near distance;

(b) a specific-distance-vision correction portion including a center and having a refractive power suitable for vision at a specific distance other than the near distance;

(c) an intermediate-vision portion between the near-vision correction portion and the specific-distance-vision correction portion, the intermediate-vision portion comprising a progressive zone exhibiting a gradual change in refractive power along the principal meridional curve from the refractive power of the near-vision correction portion to the refractive power of the specific-distance-vision correction portion;

(d) the progressive zone including a distinct-vision area and having a length, between the center of the near-vision correction portion and the center of the specific-distance-vision correction portion, of 15–19 mm, the progressive zone having a length, providing an additional power between the center of the near-vision correction portion and the center of the specific-distance-vision-distance correction portion, of 19 mm or less, and the lens refractive surface having a maximum astigmatic-difference value that is less than the additional power; and (e) the near-vision correction portion including a distinct-vision area having a maximum width that is at least five times the minimum width of the distinct-vision area in the progressive zone.

2. The progressive power lens of claim 1, wherein the distinct-vision area in the specific-distance-vision correction portion has a maximum width of at least two times the minimum width of the distinct-vision area in the progressive zone.

3. The progressive power lens of claim 1, having an additional power of 1.5 diopters or less.

4. The progressive power lens of claim 1, having a maximum astigmatic-difference value of the lens refractive surface that is less than or equal to the additional power minus 0.5 diopter.

5. The progressive power lens of claim 4, having a maximum astigmatic difference of 1.0 diopter.

6. A progressive power lens, comprising, along a principal meridional curve extending across a refractive surface of the lens and dividing the lens into a noseward portion and an earward portion:

(a) a near-vision correction portion including a center and having a refractive power suitable for vision at a near distance;

(b) a specific-distance-vision correction portion including a center and having a refractive power suitable for vision at a specific distance other than the near distance;

(c) an intermediate-vision portion between the near-vision correction portion and the specific-distance-vision correction portion, the intermediate-vision portion comprising a progressive zone exhibiting a gradual change in refractive power along the principal meridional curve from the refractive power of the near-vision correction portion to the refractive power of the specific-distance-vision correction portion;

(d) the progressive zone including a distinct-vision area and having a length, between the center of the near-vision correction portion and the center of the specific-distance-vision correction portion, of at least 15 mm;

(e) the near-vision correction portion including a distinct-vision area having a maximum width that is at least five times the minimum width of the distinct-vision area in the progressive zone; and (f) the lens having an additional power of 1.5 diopters or less, and having a maximum astigmatic-difference value that is less than the additional power.

7. The progressive power lens of claim 6, wherein the maximum astigmatic-difference value is 1.0 diopters.

\* \* \* \* \*